United States Patent [19]

Blasius et al.

[11] Patent Number: 4,647,440
[45] Date of Patent: Mar. 3, 1987

[54] PROCESS FOR THE EXTRACTION OF CESIUM IONS FROM AQUEOUS SOLUTIONS

[75] Inventors: Ewald Blasius, Saarbrücken; Karl-Heinz Nilles, Hettstadt, both of Fed. Rep. of Germany

[73] Assignee: Kernforschungszentrum Karlsruhe GmbH, Fed. Rep. of Germany

[21] Appl. No.: 571,296

[22] Filed: Jan. 16, 1984

Related U.S. Application Data

[63] Continuation of Ser. No. 412,797, Aug. 17, 1982, abandoned.

[51] Int. Cl.⁴ ............................................. B01D 11/04
[52] U.S. Cl. ..................................... 423/181; 210/638
[58] Field of Search ......................... 423/181; 210/638

[56] References Cited

U.S. PATENT DOCUMENTS

| | | | |
|---|---|---|---|
| 2,925,323 | 2/1960 | Rimshaw | 423/181 |
| 3,097,920 | 7/1963 | Knoll | 423/181 |
| 3,179,503 | 4/1965 | Horner et al. | 423/181 |
| 3,258,315 | 6/1966 | Schmitt | 423/181 |

FOREIGN PATENT DOCUMENTS

| | | | |
|---|---|---|---|
| 149403 | 7/1973 | Czechoslovakia . | |
| 149404 | 7/1973 | Czechoslovakia . | |
| 165751 | 11/1976 | Czechoslovakia . | |
| 806607 | 2/1981 | U.S.S.R. | 423/179 |

OTHER PUBLICATIONS

Rais et al, Radiochem. Radioanal. Letters 6/4/257 to 264/1971, pp. 257-264.
J. Rais et al. "New Type of Sorbents Based on Polyethers and Some Hydrophobic Anions", J. Radioanal. Chem., vol. 35, (1977), pp. 351-359.
Periodic Table, McGraw-Hill Enc. of Science & Technology, vol. 10, 4th Ed. pp. 19, 20.
C. J. Pedersen, "Cyclic Polyethers and Their Complexes with Metal Salts" Journal of the American Chemical Society, vol. 89, No. 23, Nov. 8, 1967, pp. 7017-7036.
M. Kyrs et al. "Extraction de Cesium, sous Forme de Tetraiodobismuthite, par le Nitrobenzene", Anal. Chim. Acta, vol. 27, (1962), p. 183.
Fischer et al "Grundlagen und Entwicklung des Verfahrens zur Trennung der Elemente Zirkonium und Hatnium durch Verteilen ihrer Thiocyanate" Angewandte Chemie, vol. 78, 1966, p. 19.
Von W. Ochsenfeld et al. "Mixer-Settler für Eztraktionsversuche" Kerntechnik Isotopentechnik und-Chemie, 5th vol., 1963, p. 218.
Fischer et al, Angewandte Chemie, vol. 78, 1966, pp. 19-27, "Grundlagen und Entwicklung des Verfahrens zur Trennung der Elemente Zirkonium und Hafnium durch Verteilen ihrer Thiocyanate".
Von W. Oschenfeld et al, "Mixer-Settler fur Eztraktionsversuche" Kertchnik Istoteopentechnik und-Chemie, 5th vol. 1963, pp. 218-221.
M. Kyers et al, "Extraction des Cesium, sous Forme de Tetraiodobismuthite par le Nitrobenzene", Analytica Chimica ACTA, vol. 27, 1962.

Primary Examiner—John Doll
Assistant Examiner—Wayne A. Lange
Attorney, Agent, or Firm—Sughrue, Mion, Zinn, MacPeak and Seas

[57] ABSTRACT

A process for extracting cesium ions from an aqueous solution, comprising:
(a) producing, in a polar organic solvent, an adduct compound which is the product of (i) a macrocyclic polyether containing at least one species of the structural elements (Abstract continued on next page.)

-continued

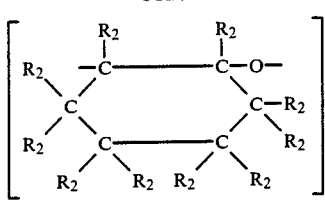
II

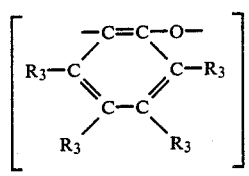
III where, in structure I, n represents one of the numbers 0, 1 or 2, the —C— (C)$_n$—O group forms part of the polyether ring and R$_1$ is H, CH$_3$, or phenyl, with up to 4 R$_1$ not being H; in structure II, the —C—C—O— group forms part of the polyether ring and R$_2$ is H, CH$_3$, t-butyl, pentyl, heptyl, nonyl, (CH$_2$)$_9$CH$_3$, or phenyl, with up to 2 R$_2$ not being H; and in structure III, the —C—C—O group forms part of the polyether ring and R$_3$ is H, CH$_3$, t-butyl, pentyl, heptyl, nonyl, (CH$_2$)$_9$CH$_3$, or phenyl, with up to 2 R$_3$ not being H; with (ii) an inorganic complex acid or a salt of the inorganic complex acid, the acid or salt containing a multivalent element of the third main group, the fifth main group, or the second subgroup of the Periodic Table as the central atom, and as ligands, a plurality of atoms of an element of the seventh main group, or a plurality of phenyl radicals or cyano radicals, excluding the establishment of an adduct of dibenzo-18-crown-6 with sodium tetraphenylborate (DB-18-C-6/NaTPB);

(b) bringing the aqueous solution containing cesium ions into contact with an adduct phase containing the adduct compound to extract the cesium from the aqueous phase into the adduct phase and thereby charge the adduct phase, and (c) separating the adduct phase charged with cesium ions from the aqueous solution.

24 Claims, 2 Drawing Figures

PROCESS FOR THE EXTRACTION OF CESIUM IONS FROM AQUEOUS SOLUTIONS

CROSS-REFERENCE TO RELATED APPLICATION

This application is a continuation application of our copending U.S. application Ser. No. 412,797, filed on Aug. 17, 1982, abandoned, the contents of which are hereby incorporated by reference.

BACKGROUND OF THE INVENTION

The present invention relates to a process for the extraction of cesium ions from aqueous solutions.

The processing and solidification of medium active aqueous wastes (MAW), developed during the reprocessing of irradiated nuclear fuels and/or nuclear breeder materials, e.g., in form of waste solutions, waste concentrates or waste sludges, is rendered more difficult by the presence of small quantities of the cesium isotopes $Cs^{134}$ and $Cs^{137}$. During the vitrification of MAW, cesium evaporates to a noticeable degree and is also easily leached out of the solidified products intended for permanent storage, such as glass blocks, cement blocks and bitumen blocks. Selective extraction of the Cs would considerably simplify the treatment of medium active wastes. Furthermore, if $Sr^{90}$ were simultaneously extracted from the MAW, low radioactive aqueous wastes (LAW=low active waste) would be obtained since, after a relatively short decay period, practically the entire activity of MAW originates from the relatively long-lived radionuclides $Cs^{137}$ ($t_{\frac{1}{2}}=30$ yrs) and $Sr^{90}$ ($t_{\frac{1}{2}}=26$ yrs).

According to prior-art processes, the extraction of Cs and Sr was achieved mainly by means of coprecipitation reactions. The coprecipitation reactions, however, did not result in satisfactory DF (decontamination factor) values for Sr and Cs. Therefore, different processes have been investigated which would make possible a selective extraction of the two radionuclides, either jointly or individually.

The extraction processes for $Cs^+$ ions developed thus far, however, are not suited for the extraction of $Cs^+$ from a typical MAW with a high concentration of $NaNO_3$ and free nitric acid. The composition of such a typical MAW is shown in the following Table 1:

TABLE 1

| Components (strongly acidic MAW) | Concentration g/dm³ | |
|---|---|---|
| Nitric acid | 64 | (1 mol/dm³) |
| Sodium nitrate | 42.5 | (0.5 mol/dm³) |
| Uranium | 1.0 | |
| Lead | 0.8 | |
| Calcium | 0.2 | |
| Magnesium | 0.2 | |
| Iron | 0.15 | |
| Ruthenium | 0.07 | |
| Potassium | 0.05 | |
| Zinc | 0.05 | |
| Copper | 0.04 | |
| Manganese | 0.02 | |
| Chromium | 0.02 | |
| Nickel | 0.01 | |
| Zirconium | 0.005 | |
| Cesium | 0.004 | |
| Cerium | 0.004 | |
| Strontium | 0.002 | |
| Antimony | 0.002 | |
| Niobium | 0.001 | |

The extraction processes for $Cs^+$ ions that have been developed use mostly organic reagents which are added either to the organic phase or to the aqueous phase to be extracted. These reagents, however, would be destroyed either hydrolytically or by oxidation, or would be made ineffective by protonization if they came into contact with the MAW whose essential components are such as those described in Table 1 above.

$Cs^+$ selective heteropoly acids are known which are very stable in the highly acid environment provided by an MAW having a composition such as described in Table 1. The $Cs^+$ selective heteropoly acids are used as extraction agents in the form of an organic phase with nitrobenzene as a solvent. For example, 12-molybdophosphoric acid (HPMo) is a $Cs^+$ selective heteropoly acid which can be dissolved in nitrobenzene. In this form, the heteropoly acids are equally unsuitable for the continuous $Cs^+$ extraction from an MAW of the type described in the above Table 1, since they bleed considerably from the nitrobenzene into the aqueous phase due to their good water solubility. They would have to be replaced continuously.

If HPMo is used, the molybdenum would enter into the MAW in large quantities and would furthermore interfere with the subsequent processing of the MAW, such as during vitrification. Finally, depending on the $Cs^+$ concentration of the MAW and the heteropoly acid concentration in the nitrobenzene phase, there is the danger of precipitate formation which could lead to considerable disruptions in a continuously operating system.

In contrast to the above prior-art water soluble extraction agents for $Cs^+$, dibenzo crown ethers have a very low water solubility and are thus, at least in part, suitable for use in a continuous extraction process.

Since crown ethers are neutral ligands, the anion in the aqueous solution being treated is also extracted during the extraction. This, however, significantly influences the extraction coefficient. In this way, simple cesium salts, such as chloride and nitrate salts, are very difficult to extract with the use of crown ethers in polar solvents, with the exception of nitromethane solutions and nitrobenzene solutions. For this reason, the prior art started to combine crown ethers with known $Cs^+$ specific reagents which contain voluminous, polarizable anions. Up to now, this has been done by adding the $Cs^+$ specific reagents, in most cases picric acid, to the aqueous phase to be extracted, and extracting with the aid of crown ethers, in most cases dibenzo-18-crown-6 (DB-18-C-6) or dicyclo-hexyl-18-C-6, in polar solvents, in most cases nitrobenzene.

For the extraction of $Cs^+$ from nuclide containing solutions, J. Rais and P. Selucky proposed two extraction systems which use DB-18-C-6. In one method, as described in Czechoslovakian Pat. No. 149403, DB-18-C-6 was employed in an organic phase and dipicrylamine was added to the aqueous phase to be extracted. In a second method, as described in Czechoslovakian Pat. No. 149404, DB-18-C-6 was employed in an organic phase and sodium tetraphenylborate was added to the aqueous phase to be extracted.

These processes, however, are limited to alkaline $Cs^+$ solutions having a pH of 11 to 13 inasmuch as dipicrylamine is protonized in the acid range, and sodium tetraphenylborate is hydrolyzed in the acid range. Moreover, both processes only function well in the absence of large quantities of $Na^+$ and $K^+$.

Furthermore, the same authors, as disclosed in Czechoslovakian Pat. No. 165751, have produced an adduct of DB-18-C-6 with 12-molybdophosphoric acid which permits a column chromatographic extraction of the $Cs^+$ from waste solutions. Large quantities of $Na^+$ and $K^+$, however, also present a problem here. The adduct of DB-18-C-6 with 12-molybdophosphoric acid was prepared by a two phase reaction in which an organic phase comprising a solution of the crown ether in dichloromethane was shaken with an aqueous phase comprising a solution of HPMo in 2 mol/l $HNO_3$. This patent also refers generally to adducts with 12-tungstophosphoric acid (HPW). A similar disclosure of an adduct of DB-18-C-6 with molybdophosphoric acid appears in *J. Radioanal. Chem.*, Vol. 35 (1977), pages 351 to 359.

SUMMARY OF THE INVENTION

It is an object of the present invention to provide an improved process for the extraction of cesium ions from aqueous solutions.

A further object of the invention is to provide such a process which functions successfully and without disruption in discontinuous and/or continuous operation, even in the presence of larger quantities of sodium or potassium ions and without being limited to certain pH ranges of the starting solutions.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for extracting cesium ions from an aqueous solution, comprising: producing, in a polar organic solvent, an adduct compound which is the product of (i) a macrocyclic polyether containing at least one species of the structural elements

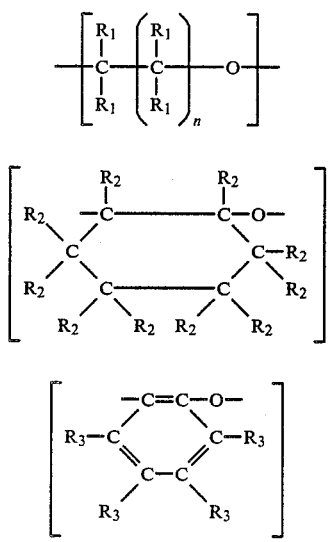

where, in structure I, n represents one of the numbers 0, 1 or 2, the $-C-(C)_n-O$ group forms part of the polyether ring and $R_1$ is H, $CH_3$, or phenyl, with up to 4 $R_1$ not being H, that is, with up to 4 $R_1$ ($\neq H$); in structure II, the $-C-C-O-$ group forms part of the polyether ring and $R_2$ is H, $CH_3$, t-butyl, pentyl, heptyl, nonyl, $(CH_2)_9CH_3$, or phenyl, with up to $R_2$ not being H, ($\neq H$); and in structure III, the $-C=C-O$ group forms part of the polyether ring and $R_3$ is H, $CH_3$, t-butyl, pentyl, heptyl, nonyl, $(CH_2)_9CH_3$, or phenyl, with up to 2 $R_3$ not being H, ($\neq H$); with (ii) an inorganic complex acid or a salt of the inorganic complex acid, the acid or salt containing a multivalent element of the third main group, the fifth main group, or the second subgroup of the Periodic Table as the central atom, and as ligands, a plurality of atoms of an element of the seventh main group, or a plurality of phenyl radicals or cyano radicals, excluding the establishment of an adduct of dibenzo 18-crown-6 with sodium tetraphenylborate (DB-18-C-6/NaTPB); bringing the aqueous solution containing cesium ions into contact with an adduct phase containing the adduct compound to extract the cesium from the aqueous phase into the adduct phase and thereby charge the adduct phase; and separating the adduct phase charged with cesium ions from the aqueous solution.

The adduct compound, when brought into contact with the aqueous solution containing the cesium ions, can be present in any one of a number of different modes. Thus, the adduct compound can be used in the form of a solution in a polar organic solvent. In an advantageous embodiment of the process of the present invention, the solution of the adduct compound is not used as such, but is applied as a liquid ion exchanger phase on silica gel, as carrier material, before its contact with the aqueous solution containing the cesium ions. Thus, by applying the adduct solution to silica gel as carrier material, there is produced a stationary phase which can be used for liquid-liquid distribution chromatography (liquid ion exchanger phase), where the stationary phase is brought in contact with the aqueous solution containing the cesium ions to extract the cesium from the aqueous solution, during which process the stationary phase is charged with cesium ions. In still another embodiment of the present invention, the adduct compound can be used as a solid ion exchanger phase (adsorption chromatography) in a solvent-free and solid form on silica gel or aluminum oxide as carrier material. In a further embodiment of the present invention, the adduct compound is present directly in solid form as a stationary phase, that is, without carrier material. Thus, in the practice of the present invention, the aqueous solution containing the cesium ions is brought into contact with the adduct compound phase, in one of the above forms, to charge the adduct compound phase with cesium ions, and the resulting aqueous solution, which is now free of cesium or contains only small amounts of cesium, is separated from the charged adduct compound phase. Extraction coefficients for cesium of up to 30 have been obtained.

The Periodic Table referred to herein is shown in McGraw Hill Encyclopedia of Science and Technology, 4th Edition, Volume 10, 1977, page 20.

It is be understood that both the foregoing general description and the following detailed description are exemplary, but are not restrictive of the invention.

DETAILED DESCRIPTION OF THE INVENTION IN GENERAL

Figure 1:
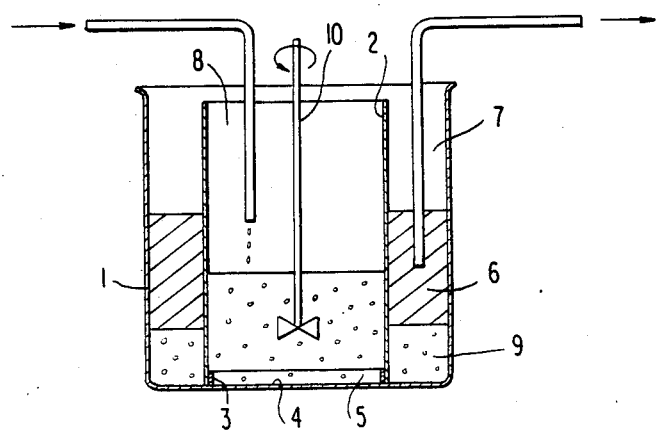
FIG. 1 shows an apparatus in which an extraction can be formed in accordance with the teaching of the present invention.
Figure 2:
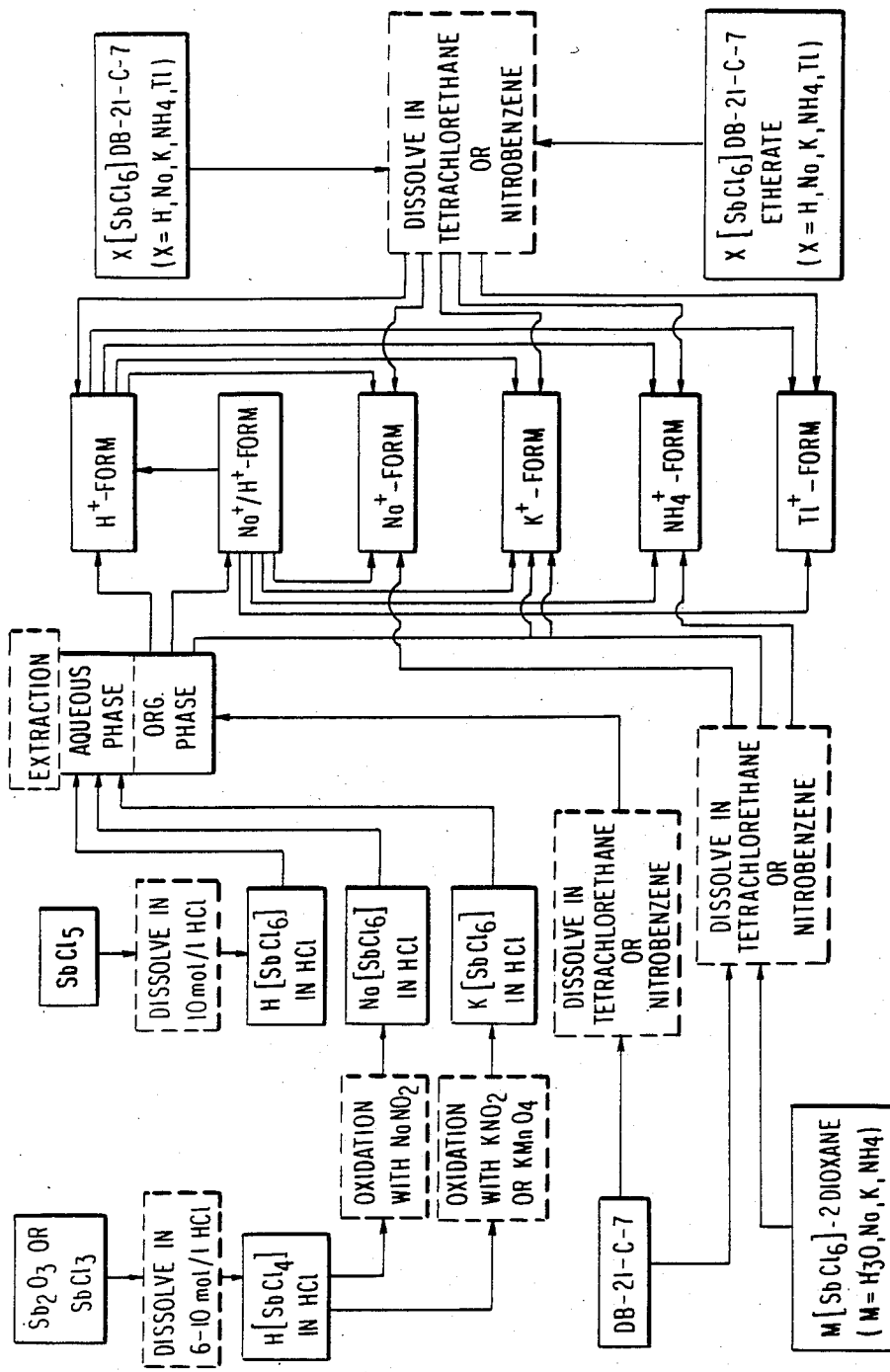
FIG. 2 schematically illustrates various possibilities for producing a macrocyclic ether/complex acid or salt adduct solution containing a DB-21-C-7/hexachloroantimony (V)-acid/salt adduct solution in accordance with the teachings of the present invention.

The adduct compounds employed in the present invention are the product of (a) a macrocyclic polyether and (b) an inorganic complex acid component which is an inorganic complex acid or a salt of the inorganic complex acid.

Preferably, the macrocyclic polyether is selected from the group 2,3,11,12-dibenzo-1,4,7,10,13,16-hexa-oxa-cyclooctadeca-2, 11-diene, known as dibenzo-18-crown-6, and abbreviated DB-18-C-6; 2,5,8,15,18,21-hexa-oxa-tricyclo[20.4.0.0$^{9,14}$]-hexacosane, known as dicyclo-hexyl-18-crown-6, and abbreviated DC-18-C-6; or higher homologues thereof having up to 30 atoms in ring form and containing up to 10 oxygen atoms; and benzo-15-crown-5, abbreviated as B-15-C-5. The DB-18-C-6 and DC-18-C-6 crown ethers contain 18 atoms in their polyether ring, and higher homologues of these crown ethers refer to crown ethers having more than 18 atoms in their polyether ring. Preferred higher homologues which are suitable in the practice of the present invention are DB-21-C-7 and DB-24-C-8.

B-15-crown-5, DB-18-C-6, DB-21-C-7 and DB-24-C-8 are exemplary of crown ethers which contain structural elements III, with B-15-crown-5 containing one such structural element III and DB-18-C-6, DB-21-C-7 and DB-24-C-8 containing two structural elements III. DC-18-C-6 is exemplary of crown ethers which contain structural elements II, and specifically contains two of such structural elements II. Generally, crown ethers containing up to 30 atoms in their polyether ring and containing structural elements I and/or II and/or III, contain either elements I or elements II or elements III, contain up to 4 of structural elements II or III. See C. J. Pedersen, *J. Am. Chem. Soc.*, Volume 89, page 7017 et seq. for a description and naming of crown ethers.

In another preferred embodiment of the present invention the adduct compound is the product of (i) a crown ether with a polyether ring containing 21 atoms and 7 O-atoms with one or more $R_1$ and/or $R_2$ and/or $R_3$ ($R_1$=H,CH$_3$, or phenyl;

$R_2$=H,CH$_3$, t-butyl, pentyl, heptyl, nonyl, (CH$_2$)$_9$CH$_3$, or phenyl;

$R_3$=H,CH$_3$, t-butyl, pentyl, heptyl, nonyl, (CH$_2$)$_9$CH$_3$, or phenyl)

with (ii) an inorganic complex acid or a salt of the inorganic complex acid.

In the following, suitable crown ethers as examples are listed:

Elements I:

n= 0
plus
n = 1

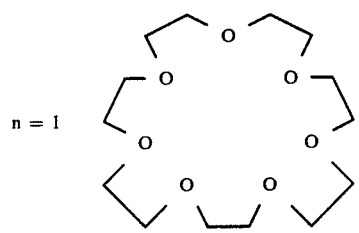

n = 1 n = 1 n = 1
plus
n = 2 n = 1 n = 1
plus
n = 2

Elements I and elements II with R$_2$

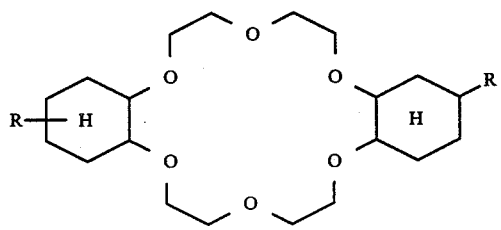

R = H
R = CH$_3$
R = (CH$_2$)$_9$CH$_3$
R = C$_6$H$_5$

Elements I and one element II

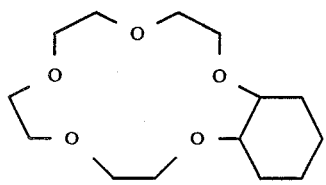

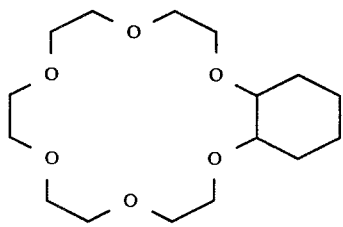

Elements I and one element III with R₃

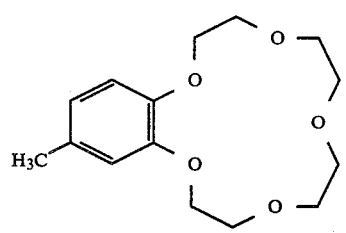

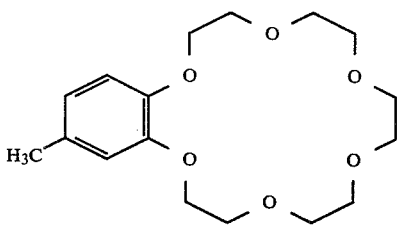

Elements I and one elements III (or II)

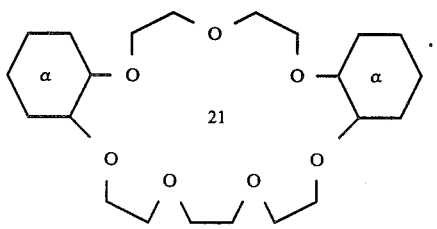

α = BENZO
α = CYCLOHEXYL

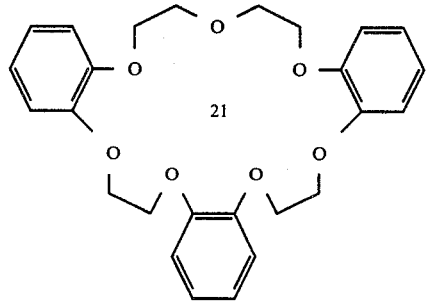

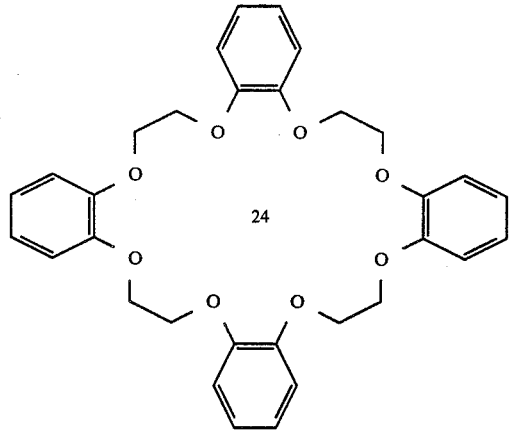

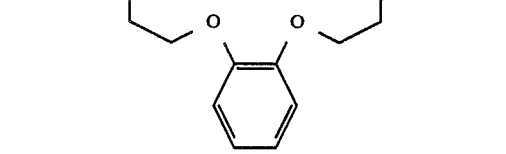

Elements I and one element II and one element III

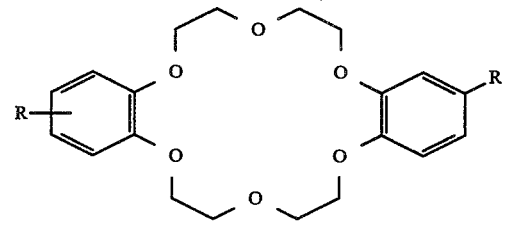

The inorganic complex acid or its salt which is used to form the adduct compound employed in the present invention contains a multivalent element of the third or fifth main group of the Periodic Table or of the second subgroup of the Periodic Table as a central atom, and a plurality of atoms of an element of the seventh main group or a plurality of phenyl radicals or cyano radicals as ligands. Exemplary of suitable central atoms are Sb and Bi which are from the fifth main group of the Periodic Table, B from the third main group of the Periodic Table, and Hg from the second subgroup of the Periodic Table. Exemplary ligands from the seventh main group which are attached to the central atom are Cl and I. Preferred inorganic complex acids are HSbCl₆ (hexachloro-antimony (V) acid); $H_2HgI_4$ (tetraiodide mercuric acid); and $HBiI_4$ (tetraiodide bismuth acid). Preferred salts of these acids are the Na, K, $NH_4$ and Tl salts of these acids. These salts are referred to as the M(I) charged form of the acids, where M(I) is Na, K, $NH_4$ or Tl. Other preferred salts which can be used are sodium tetraphenylborate (NaTPB), potassium tetraphenylborate (KTPB), sodium triphenyl cyanoborate (NaTPCB) and potassium triphenyl cyanoborate (KTPCB).

The adduct compounds employed in the present invention generally are produced in a polar organic solvent. Especially suitable polar organic solvents for producing the adduct compound are nitrobenzene, 1,2-dichlorobenzene, 1,1,2,2-tetrachloroethane, 1,2-dichlorethane and mixtures thereof. The adduct compounds can be prepared by dissolving the individual adduct components in the polar organic solvent in a molar ratio of macrocyclic polyether to complex acid or complex salt, respectively of $\geq 1:1$, up to, for example 2:1.

Although the adduct compounds are produced in a polar organic solvent, they need not be used in a polar organic solvent to effect the extraction of the Cs ions. The adduct compounds can be used in a number of different modes to effect the extraction of the cesium ions.

In general, the extraction preferably is effected in one of four different methods. In the first method, the adduct compound is present in an adduct solution where it is dissolved in an organic solvent selected from the group nitrobenzene, 1,2-dichlorobenzene, 1,1,2,2-tetrachloroethane, 1,2-dichloroethane, and mixtures thereof, and the adduct solution is contacted with the aqueous phase containing the Cs ions.

In a second method, the adduct compound is present as a liquid ion exchanger phase on silica gel as a carrier material, and the aqueous phase containing the Cs ions is brought into contact with the liquid ion exchanger phase. The liquid ion exchanger phase can be prepared by applying any of the adduct solutions employed in the present invention onto silica gel as a carrier material. By applying the adduct solution to silica gel, there is produced a liquid ion exchanger which can be employed as a stationary phase in the extraction chromatography (liquid-liquid-distribution chromatography) having silica gel as carrier material.

In the third method, the adduct compound is present as a solid ion exchanger phase in a solvent-free and solid form on silica gel or aluminum oxide as carrier material, and the aqueous phase containing the Cs ions is brought into contact with the solid ion exchanger phase. In order to produce a solid ion exchanger phase in which the crown ether adduct is present in a solvent free and solid form, on silica gel or $Al_2O_3$ as carrier material, the complex acid- or complex acid salt-crown ether adducts, e.g. $X^+[SbCl_6]^-$/polyether adducts, where $X^+=H^+$, $Na^+$, $K^+$, $NH_4^+$ or $Tl^+$, are applied to the carrier material from their solutions in a solvent such as acetone, dichloromethane, chloroform or 1,2-dichloroethane, and then the solvent is removed as by vacuum extraction and evaporation.

In the fourth method, the adduct compound is present directly in solid form as a stationary phase, that is, without a carrier material, and the aqueous phase containing the Cs ions is brought into contact with the solid adduct compound. The solid adduct compound when used directly as a stationary phase has had the polar organic solvent, used to prepare it, extracted.

The various forms in which the adduct compound is employed in the Cs extraction can be prepared by a number of different methods. For example, when the adduct compound is used in the form of an adduct solution, the adduct solution can be prepared by directly dissolving the individual adduct components, the polyether and the inorganic complex acid or its salt in the polar organic solvent. Alternatively, an adduct solution can be prepared by dissolving an already produced solid adduct in the polar organic solvent. Various techniques for producing the adduct compound in the various forms in which it is used in the Cs extraction are explained in detail below.

When the synergistically acting adducts for use in the Cs extraction are prepared in the form of adduct solutions which are formed with the complex inorganic acids, the adduct solutions represent liquid exchangers in the $H^+$ form having one exchangeable proton each.

Other charged forms of the liquid exchanger, for example, $Na^+$, $K^+$, $NH_4^+$, $Tl^+$ forms, can easily be obtained by shaking the $H^+$ form of the liquid exchanger with the corresponding M(I) nitrate solution, where M(I) equals $Na^+$, $K^+$, $NH_4^+$ or $Tl^+$. For example, the $NH_4$ form of the liquid exchanger can be prepared by shaking the $H^+$ form adduct solution for one hour with a 3 mol/l $NH_4NO_3$ solution. Similarly, the $K^+$ form of the liquid exchanger can be prepared by shaking the $H^+$ form adduct solution for one hour with a 2 mol/l $KNO_3$ solution to produce the $K^+$ form.

It is a principal advantage of the process according to the present invention that a combination of a crown ether, e.g. of DB-21-C-7, with the inorganic complex acid component (which by itself is a $Cs^+$ specific extraction agent) leads to a synergistic increase in the extraction coefficient, which is sometimes considerable, as compared to that of the $Cs^+$ specific inorganic complex acid component extraction agent alone (complex acid or the salt thereof, respectively) as well as to that of the crown ether alone.

The crown ether not only increases or makes possible the solubility of the inorganic complex acid components (which by themselves are $Cs^+$ specific extraction reagents) in certain organic solvents, but almost completely prevents their bleeding or stabilizes them in such a manner that they can be employed outside their normal range of existence. These $Cs^+$ specific inorganic complex acid components normally exist in a highly acid medium, but in the practice of the present invention can, under appropriate circumstances, be employed in the presence of solutions having a pH of up to 13.

It is a further, considerable advantage of the extraction process of the present invention that the charged adducts can easily be regenerated by continuous or discontinuous re-extraction of the cesium ions from the charged adduct phase with an alkali metal salt solution or ammoniun salt solution. The regenerated adduct can then be reused for treating further aqueous charges containing Cs ions. The salt solution obtained after such a regeneration, and containing the radioactive cesium, can be concentrated by evaporation, and the concentrate on the resulting salt cake can be transferred to a suitable solidification matrix for permanent storage. Alternatively, the concentrate or salt cake, respectively, can be added to the highly radioactive waste.

CROWN ETHER-HEXACHLOROANTIMONY ADDUCTS

Crown ether adducts can be prepared which contain hexachloroantimony (V) acid $H^+[SbCl_6]^-$, or the $M^+[SbCl_6]^-$ salts thereof, respectively, or hexachloroantimonate (V)-dioxanate ($M^+[SbCl_6]^-$-dioxane), where $M^+ = Na^+$, $K^+$, $NH_4^+$, $[H_3O]^+$ or $Tl^+$ as the inorganic complex acid component which contains, as the central atom, an element from the above-mentioned element groups of the Periodic Table, and as ligands, halogen. Such crown ether-hexachloroantimony adducts preferably contain a molar ratio of crown ether to hexachloroantimony component of $\geq 1:1$, up to, for example 2:1. These adducts preferably are employed in the form of adduct solutions which can be prepared according to any one of a number of different methods such as described herebelow.

In an especially advantageous embodiment of the process according to the present invention, crown ether-hexachloroantimony adduct solutions are prepared directly by dissolving the individual components of the adduct in a polar organic solvent. The polar organic solvent can be nitrobenzene, 1,2-dichlorobenzene, 1,1,2,2,-tetrachloroethane or 1,2-dichloroethane, and the adduct components are dissolved in a molar ratio of macrocyclic polyether to complex acid or complex salt, respectively, of $\geq 1:1$, up to, for example 2:1.

In an alternate embodiment of preparing a crown etherhexachloroantimony adduct solution, an adduct of hexachloroantimony with dioxane is first prepared. The dioxane adduct can be prepared by producing a complex salt solution of, e.g., $M^+[SbCl_6]^-$ in hydrochloric acid where $M^+ = Na^+$, $K^+$, $[H_3O]^+$, or $NH_4^+$, and then precipitating a 1,4-dioxanate of the complex salt (dioxane adduct) by bringing the salt solution into contact with dioxane. The preparation of these dioxane adducts is illustrated below in Technique 3.

Thereafter, the crown ether adduct solution is prepared by dissolving the crown ether, e.g., DB-21-C-7 and the $M^+[SbCl_6]^-$ dioxanate in the polar organic solvent. During the dissolution of the two components (i.e., the dioxane adduct and the DB-21-C-7), the dioxane adduct is converted into the DB-21-C-7 adduct by a base exchange, e.g., at the Sb(V). It is noted that dioxane can be formally called 6-crown-2.

In contrast to the pure salts $M^+[SbCl_6]^-$, where $M^+$ is $[H_3O]^+$, $Na^+$, $K^+$ or $NH_4^+$, which are considerably less obtainable, the dioxane/$M^+[SbCl_6]^-$ adducts, where $M^+$ is $K^+$, $[H_3O]^+$, $Na^+$ or $NH_4^+$ are not sensitive to hydrolyzation and thus are easily manageable.

In another embodiment for the production of solutions of adducts formed with complex acids or the salts thereof, respectively, the solution is prepared by extracting the complex acid or its salt from hydrochloric acid, such as a 6 to 10 mol/l hydrochloric acid solution, by means of a crown ether which is dissolved in nitrobenzene, 1,2-dichlorobenzene, 1,1,2,2-tetrachloroethane, or 1,2-dichloroethane, at a molar ratio of crown ether to complex acid or salt of $\geq 1:1$ to produce a crown ether complex acid or salt adduct solution which is then separated from the hydrochloric acid solution. When the hydrochloric acid solution contains the acid $H[SbCl]_6$, after production of the adduct solution by extraction, the crown ether complex acid adduct can be converted into the corresponding $M^+$ charged form by bringing the adduct solution into contact with an aqueous $M^+$ salt solution, where $M^+ = Na^+$, $K^+$, $NH_4^+$ and $Tl^+$ to form a crown ether-complex salt adduct solution.

The production of crown ether adduct solutions by way of the dioxane adduct offers a number of advantages. Thus, the dioxane adduct technique enables the direct dissolution of individual components in solid form and provides for good manageability. In particular, the crown ether-complex acid salt adduct solution need not be produced before it is needed. Moreover, in comparison to the method where the crown ether adduct solution is produced by extraction of the complex acid from a hydrochloric acid solution into a crown ether solution, and then converting the resulting crown ether-complex acid adduct solution into the corresponding $M^+$ charged form, the dioxane adduct technique does not employ such a conversion since the corresponding $M^+$ ion is already contained in the $M^+[SbCl_6]^-$ dioxanates. In addition, possible hexachloro antimonate (V) losses, such as those caused by hydrolysis, can easily be compensated for by the dioxane adduct, thus re-establishing the original crown ether ratio:$M^+[SbCl_6]^-$ of $\geq 1:1$.

In another embodiment of the present invention for producing adduct solutions, a crown ether/$M^+[SbCl_6]^-$ adduct solution, such as a dibenzo crown ether/$M^+[SbCl_6]^-$ adduct solution, can be produced by dissolving a crown ether complex acid or salt adduct in the polar organic solvent. This embodiment of the present invention can be performed according to a number of different methods. In a first method, the adduct compound which is dissolved in the polar organic solvent is a solid or oily adduct compound which has been obtained by the previously described extraction of the complex acid or salt into a crown ether solution. When the extraction is with the complex acid, the resulting crown ether-acid adduct solution can be converted into the corresponding $M^+$ charged form. For example, the adduct compound which is dissolved can be obtained by extracting $H^+[SbCl_6]^-$ from 6 to 10M hydrochloric acid by means of a crown ether/dichloromethane solution, such as a dibenzo-crown ether/dichloromethane solution, by treating the dichloromethane phase with an aqueous phase containing $M^+$ chloride solution, where $M^+ = Na^+$, $K^+$, or $NH_4^+$, or by an aqueous $TlNO_3$ solution, by separating the aqueous phase from the dichloromethane phase, and then by drying and by concentrating (evaporating) the dichloromethane phase to obtain the solid or oily adduct compound. This method is illustrated by Technique 1a below. The adduct compound so prepared can then be dissolved in the polar organic solvent.

In a second method, the adduct compound which is dissolved in the polar organic solvent is an adduct compound in crystalline state obtained according to the method just described and which has then been subjected to a further treatment in which the adduct compound is reprecipitated. This reprecipitation can be achieved with the use of diethyl ether to produce the corresponding etherate or with dioxane. This method is illustrated by Technique 1b below. The reprecipitated adduct compound is then dissolved in the polar organic solvent to prepare the adduct solution.

In the third method, the adduct compound which is dissolved in the polar organic solvent is an adduct compound in crystalline state obtained by precipitating from a homogeneous solution. This method is illustrated by Technique 2a and 2b below. For example, a $H^+[SbCl_6]^-$ solution in hydrochloric acid can be contacted with a clear solution comprised of (a) a crown ether, such as a dibenzo crown ether, and (b) an aqueous $M^+Cl^-$ solution.

The production of the adduct solution by way of the adduct compounds, which first have been obtained in their solid state, and by dissolving the solid, easily measured adducts as they are needed has the advantage that the adducts stored in a stable state are used directly in the desired M(I) charged form.

The production of adducts in solid form will now be illustrated for adducts of DB-21-C-7 with chloroantimonates, which can be quantitatively isolated in solid form by one of the following techniques:

TECHNIQUE 1a

An $H[SbCl_6]$ stock solution is obtained by diluting 5 $cm^3$ of $[SbCl_5]$, having a density equal to 2.35 $g/cm^3$, with a solution containing 10 mol/l HCl to 250 $cm^3$. The 10 mol/l HCl comprises 10 parts HCl in a 37% concentration + 2 parts $H_2O$. 10 $cm^3$ of the stock solution are vigorously shaken for ½ hour with 20 $cm^3$ dichloromethane in which 0.5 g DB-21-C-7 have been dissolved. Wide-necked polyethylene bottles, having a volume of 50 or 100 $cm^3$ and containing a screw closure which can easily be clamped into any shaking device is preferably used for this and the following techniques.

The mixture is then left to settle to effect a complete demixing of the dichloromethane phase, which now contains the DB-21-C-7/$H[SbCl_6]$ adduct in pure $H^+$, from the aqueous phase. The demixed dichloromethane phase is then syphoned off through the aqueous phase with the aid of a pipet. The syphoned off dichloromethane phase is transferred to a vessel together with 10 $cm^3$ of a 3 mol/l $M^+Cl^-$ solution, where $M^+$ is $K^+$, $NH_4^+$ or $Na^+$, or with 10 $cm^3$ of a saturated $TlNO_3$ solution, and vigorously shaken for ½ hour. This shaking step may be repeated once, and this repetition is especially recommended if producing the $Na^+$ form. The organic phase, which now contains the corresponding M(I) charged form, is separated from the aqueous phase, and then is dried over $MgSO_4$, and subsequently concentrated in a rotation evaporator. A solid product is obtained in the case of the $K^+$, $NH_4^+$ and $Tl^+$ form, and a viscous oil is obtained in the case of the $H^+$ and $Na^+$ form.

TECHNIQUE 1b

In principle, the $K^+$, $NH_4^+$ and $Tl^+$ forms obtained by Technique 1a can be left as is. They can, however, also be reprecipitated by dissolving them into 5 $cm^3$ of dichloromethane and by precipitating them in the form of etherates by contacting them with 20 $cm^3$ diethylether to produce yellow to yellowish brown etherates. The dichloromethane solvent is then separated by heating to 120° C., and during the separation of the solvent residue at 120° C., the ether component is separated from the adduct which then changes into an orange colored powder. In the same manner, a yellow etherate of the $H^+$ or $Na^+$ forms can be precipitated from the oily residues. At 80° C., during the separation of the solvent residues, this etherate turns into a dark yellow powder. In the above reprecipitation, diethylether can be substituted by dioxane, in which case the corresponding dioxanates are obtained.

The hexachloroantimonate (V) adducts produced in this manner are of infinite stability, under dry storage conditions, and are thermally stable, with the $NH_4^+$ form being stable up to 200° C.

TECHNIQUE 2

The hexachloroantimonate (V) adducts can also be obtained by precipitation from a homogeneous solution in an especially simple way by the following two techniques 2a and 2b. The possibilities for producing these adducts from a homogeneous solution, however, are not limited to these techniques.

TECHNIQUE 2a

In a solution of 0.5 g DB-21-C-7 in 20 $cm^3$ dioxane, 1 g solid $M^+Cl^-$, where $M^+ = Na^+$, $K^+$, $NH_4^+$, was completely dissolved by adding 5 to 8 $cm^3 H_2O$ and heating to 50° to 60° C. to produce a Solution I.

A precipitation reagent was produced by taking exactly 3.4 $cm^3$ from an approximately 0.4 mol/l $H[SbCl_6]$ starting solution and by diluting this 3.4 $cm^3$ starting solution with 35 $cm^3$ of 10 mol/l HCl to produce a Solution II. The starting solution had been produced by diluting 5 $cm^3 SbCl_5$ with 10 mol/l HCl to a total of 100 $cm^3$.

Within a few seconds, and while stirring vigorously, Solution II was subsequently added to Solution I, which had cooled off to approximately 30° C. During this addition a voluminous, yellow to yellowish orange precipitate of the corresponding DB-21-C-7/$M[SbCl_6]$ dioxanate was precipitated. The precipitate then was filtered by suction through a glass frit G 4, washed with 20 $cm^3$ of 10 mol/l HCl, and dried over NaOH in a desiccator.

TECHNIQUE 2b

In a solution, which contained 5 $cm^3$ of the approximately 0.4 mol/l $H[SbCl_6]$ starting solution, 35 $cm^3$ of 10 mol/l HCl, 10 $cm^3 H_2O$ and 10 $cm^3$ methanol, 1 g $M^+Cl^-$, where $M^+ = Na^+$, $K^+$, $NH_4^+$, was dissolved by heating. Within a few seconds, and while stirring vigorously, a solution of 0.5 g DB-21-C-7 in 10 $cm^3$ methanol was added to the solution mixture which still had a temperature of 30° C. During this addition, a voluminous yellowish brown precipitate was formed. After stirring for 15 minutes at room temperature, a crystal-ether-free DB-21-C-7/$M[SbCl_6]$ was isolated by filtering, washing and drying as in Technique 2a.

Within the scope of the process according to the present invention, a method was developed simultaneously for the simplified preparation of the $M^+[SbCl_6]$ salts, where $M^+ = [H_3O]^+$, $Na^+$, $K^+$, $NH_4^+$, which otherwise are obtainable only with considerable more difficulty. These salts, similar to the crown ether adducts, can be isolated as dioxane adducts in an especially simple manner by the following Technique 3.

TECHNIQUE 3

With a pipet, 2 $cm^3 SbCl_5$ is transferred into 30 $cm^3$ 10 mol/l HCl and therein 1.8 g NaCl or 1.3 g $NH_4Cl$ or 1.3 g KCl is dissolved by means of heating. After having cooled down to approximately 60° C., 5 $cm^3$ dioxane is added under stirring whereby a colorless, voluminous precipitate is formed immediately. Without the addition of NaCl, $NH_4Cl$, or KCl the pure Oxonium salt ($[H_3O]^{30}$ salt) is formed which is even more stable against hydrolysis than the other salts. After having cooled off in an ice bath, the corresponding adduct is separated by means of a glass frit G 4, and washed first with 10 $cm^3$ 10 mol/l HCl and subsequently with 20 $cm^3$ dichloromethane. After having been dried by suction for 15 minutes, the adduct was dried over NaOH in a desiccator for 24 hours. In this manner, dioxane adducts in a M[SbCl$_6$]:dioxane ratio of 1:2 are obtained.

These dioxane adducts are very easily soluble in H$_2$O where, even in the presence of much H$_2$O, hydrolysis does not start until after approximately 10 minutes for the K$^+$ salt and only after several hours for the NH$_4$$^+$ salt. They are also soluble in nitromethane and nitrobenzene. These dioxane adducts are not easily soluble in chlorinated hydrocarbons, but are easily soluble in the presence of DB-21-C-7, in which case yellow solutions are obtained. The good water solubility and the delayed hydrolysis make it possible, in the continuous extraction process, to compensate for the hexachloroantimonate losses which can occur in DB-21-C-7/hexachloroantimonate adduct solutions by adding the corresponding M[SbCl$_6$] dioxane adduct to the aqueous phase to be extracted (light phase) wherefrom it is then extracted into the organic phase (heavy phase), thus reestablishing the original mol ratio.

The M[SbCl$_6$] dioxane adducts, dissolved in H$_2$O, can also be used for qualitative analysis as Cs$^+$ specific precipitation reagents. Contrary to some other Cs$^+$ specific reagents (e.g., Kalignost, Cäsignost, heteropoly acid, H$_2$[PtCl$_6$], picric acid), K$^+$ and NH$_4$$^+$ do not present a problem here. Furthermore, they can be used over the entire pH range while most of the usual Cs$^+$ precipitation reagents are limited to certain pH ranges.

Chloroantimonate-crown ether adducts have a very high solubility in some chlorinated hydrocarbons such as dichloromethane, chloroform, 1,2-dichloroethane, 1,1,2,2-tetrachloroethane, and in 1,2-dichlorobenzene. The highest extraction coefficients for a simple batch extraction from an MAW having the composition shown in Table 1 are obtained in nitrobenzene, however, as shown by the example of the Na$^+$ form of the adduct which is reported in the following Table 2. In the tests reported in Table 2, adduct concentrations of 0.018 and 0.036 mol/l were used, which were 600 times or 1200 times excess, respectively, of the extraction agent in relation to the concentration of Cs$^+$ ion in the MAW.

TABLE 2

| Solvents | Extraction coefficient for DB—21-C—7/Na[SbCl$_6$] (molar ratio 1.5:1) | |
|---|---|---|
| | 0.018 mol/l based on the mols of Sb(V) | 0.036 mol/l based on the mols of Sb(V) |
| chloroform | 20.3 | |
| 1,2-dichloroethane | 25.6 | 54.0 |
| 1,1,2,2-tetrachloroethane | 27.9 | 64.3 |
| 1,2-dichlorobenzene | 28.3 | 68.4 |
| nitrobenzene | 81.8 | 389.0 |

The high synergistic effect of these adducts is noteworthy. The synergistic effect S is given by the formula $S = D_{1,2}/(D_1 + D_2)$ where $D_{1,2}$ is the extraction coefficient of the adduct, $D_1$ is the extraction coefficient of the crown ether alone, and $D_2$ is the extraction coefficient of the complex acid salt alone. For chlorohydrocarbons, the synergistic effect is approximately 1200, it being noted that the chloroantimonates are not soluble in the chlorohydrocarbons without the crown ether.

These adducts are also suitable for use in continuously operating extraction systems. Except for their toxic effect, tetrachloroethane, dichlorobenzene and nitrobenzene, possibly also dichloroethane, are most suitable as solvents for the adducts, as can be seen from the following comparison of the solvent properties relevant to the extraction:

TABLE 3

| Solvents | Solvent data | | | |
|---|---|---|---|---|
| | partial pressure (torr; 25° C.) | density (25° C.) | $\epsilon$ (25° C.) | flash point (°C.) |
| Dichloromethane | 435.8 | 1.317 | 8.93 | none |
| Chloroform | 194.8 | 1.480 | 4.8 | none |
| Dichloroethane | 83.3 | 1.246 | 10.36 | 13.3 |
| Tetrachloroethane | 5.95 | 1.586 | 8.2 | none |
| Dichlorobenzene | 1.28 | 1.300 | 9.93 | 66.0 |
| Nitrobenzene | 0.284 | 1.198 | 34.82 | 87.8 |

Dichloromethane and chloroform might be eliminated as solvents because their vapor pressure is too high. Furthermore, in spite of a crown ether molar excess of 50%, as compared to an adduct having a 1:1 molar ratio, stronger bleeding of the chloroform has been observed as evidenced by a dielectricity constant ($\epsilon$) value which is too low.

In addition to the extraction of Cs$^+$ traces, DB-21-C-7/hexachloroantimonate (V) adducts can also be used for the extraction of solutions with higher Cs$^+$ concentrations. Provided that the organic phase contains a molar excess of crown ether, as compared to an adduct having a 1:1 molar ratio, and thus has been stabilized, and the aqueous phase to be extracted has an adequate Na$^+$ and/or Cl$^-$ concentration, extractions are also possible in the pH range of 0 to 7, and if the K$^+$ form is used, even beyond that range.

As with all the adduct solutions disclosed in the present invention, the hexachloroantimony-crown ether adduct can be employed as stationary phase in the extraction chromatography (liquid-liquid-distribution chromatography) having silica gel as carrier material.

Moreover, the hexachloroantimony-crown ether adducts can be employed as a solid ion exchanger phase on a carrier material. In order to produce a solid ion exchanger phase in which the crown ether adduct is present in a solvent free and solid form, on silica gel or Al$_2$O$_3$ as carrier material, the complex acid or comlex salt-crown ether adducts, e.g., X$^+$[SbCl$_6$]$^-$/polyether adducts, where X$^+$ = H$^+$, Na$^+$, K$^+$, NH$_4$$^+$ or Tl$^+$, are applied to the carrier material from their solutions in a solvent such as acetone, dichloromethane, chloroform or 1,2-dichloroethane, and then the solvent is removed as by vacuum extraction and evaporation.

Thus, for example, the adducts, obtained according to techniques 1a, 1b, 2a and 2b, after the solvent has been completely removed, can be dissolved in acetone or dichloromethane and can be applied to silica gel. The acetone or dichloromethane solvent is then removed as by vacuum extraction and/or evaporation.

Finally, the solid adducts can be used directly as column material in the ion exchanger chromatography.

CROWN ETHER/NaTPB OR NaTPCB ADDUCTS

Crown ether adducts can be prepared which contain sodium triphenyl borate (NaTPB), sodium triphenyl cyanoborate (NaTPCB), potassium triphenyl borate (KTPB) or potassium triphenyl cyanoborate (KTPCB) as the inorganic acid salt component of the crown ether adduct. Preferably, DB-21-C-7 is employed as the crown ether component of such adducts. These adducts preferably are prepared in a molar ratio of crown ether to inorganic acid salt of 2:1 or 1:1. These adducts preferably are employed in the form of a solution in a polar organic solvent to extract cesium ions from aqueous solution.

The adduct solutions used for the Cs extraction are prepared in a similar manner, and the method of preparation will be illustrated for DB-21-C-7/NaTPB and DB-21-C-7/NaTPCB.

The DB-21-C-7/NaTPB or DB-21-C-7/NaTPCB adduct solutions can be produced by (1) directly dissolving the individual components in a suitable polar organic solvent, or (2) by dissolving, in a suitable polar organic solvent, a solid adduct obtained from a homogeneous solution. For example, the solid adduct which is dissolved can be obtained from a homogeneous solution of, e.g., dioxane/$H_2O$ or methanol/$H_2O$, by means of precipitation. As another example, the solid adduct which is dissolved can be obtained by evaporating a solution, such as, for example, an acetone solution, which contains both of the adduct components in stoichiometric proportions.

In contrast to the process according to Czechoslavokian Pat. No. 149,404, the use of DB-21-C-7/NaTPB also makes possible extractions from highly acidic solutions, such as the above-mentioned MAW of Table 1 with its high $Na^+$ content. While the decomposition of NaTPB is not prevented by the use of a crown ether excess of 100%, that is a molar ratio of crown ether to complex acid salt of 2:1, and by the conversion of the adduct phase into the $K^+$ form, the decomposition of the NaTPB in the DB-21-C-7/NaTPB adduct is nevertheless considerably retarded. Thus, after 1 liter of the MAW of Table 1 has passed through a treatment vessel containing 40 ml of a 0.018 mol/l DB-21-C-7/KTPB (2:1) (based on the mols of boron; this adduct solution has 0.036 mol/l DB-21-C-7 and 0.018 mol/l KTPB) adduct solution in nitrobenzene, only 30% of the used NaTPB was hydrolyzed after a total of 6 hours. After a total of 50 hours of contact with the MAW, however, 71% of the NaTPB were already hydrolytically decomposed. For this reason, adducts having NaTPB or NaTPCB do not appear suitable for extractions in a continuous process from highly acidic MAW solutions, especially since the cost of the NaTPB (trade name Kalignost) is very high, with 100 g costing about $100.00. sodium triphenylcyanoborate (NaTPCB) (trade name Cäsignost) is even more expensive. Therefore, the use of NaTPB and NaTPCB would mainly be limited to slightly acid up to strongly alkaline MAWs. Simple batch extractions from strongly acid MAWs having, for example, a $p_H<1$, however, are definitely possible, as shown in the above discussed extraction example.

Especially suitable solvents for the adduct solution for extraction of $Cs^+$ ions are nitrobenzene and 1,2-dichloroethane. While NaTPB in nitrobenzene or nitromethane, even without DB-21-C-7, already provides very high D-values for the extraction of Cs from strongly alkaline MAW solutions with high $Na^+$ concentration, an extraction using, e.g., 1,2-dichloroethane as the solvent is possible only in the presence of DB-21-C-7.

As can be seen in Example 9 below, the D-value for the extraction with NaTPB in nitrobenzene is higher in the absence of crown ether. The reason for this is that the somewhat lower Cs selectivity of the DB-21-C-7 counteracts the higher Cs selectivity of the NaTPB (anti-synergism). In the case of DB-18-C-6, this anti-synergism goes so far that extractions from solutions with higher $Na^+$ concentrations are no longer possible. See Czechoslavokian Pat. No. 149404.

The NaTPB/DB-21-C-7 adduct combinations of the present invention provide numerous important advantages compared to the use of pure NaTPB as follows:

First, bleeding of the NaTPB, which is easily soluble in nitrobenzene as well as in $H_2O$, is largely prevented by the DB-21-C-7, which results in lower costs and makes possible the use of a continuous extraction operation.

Second, the too high Cs selectivity of the NaTPB is lowered by the addition of DB-21-C-7. As a result, an effective re-extraction with $KNO_3$ solutions becomes possible, as shown by a re-extraction coefficient of $\overline{D}$ equal to 30. In contrast, if NaTPB is used alone, the re-extraction is not nearly as complete, as shown by a re-extraction coefficient $\overline{D}$ equal to 1.

Further, nitrobenzene, chloroform or 1,2-dichloroethane can be used as a solvent to form the organic phase.

Comparing the NaTPB/DB-21-C-7 combination to the NaTPB/DB-18-C-6 combination of Czech Pat. No. 149404, the following further advantages are evident. Thus, $Cs^+$ extractions from MAW solutions with high $Na^+$ concentrations such as 1.5 mol/l $NaNO_3$, as shown in Example 9 below, are made possible with the adducts of the present invention.

Moreover, the extraction agent NaTPB together with the crown ether is present in the organic phase from the beginning. In addition, adducts having DB-21-C-7 generally are more readily soluble in the mentioned polar organic solvents than those having DB-18-C-6, thus making possible higher adduct concentrations and thus higher $Cs^+$ charging into the organic phase.

CROWN ETHER—$H_2HgI_4$ AND $HBiI_4$ ADDUCTS

Adduct compounds of a crown ether and tetraiodo acid $H_2[HgI_4]$ or the Na, K or $NH_4^+$ salts thereof, or adduct compounds of a crown ether and tetraiodo bismuth acid $H[BiI_4]$ or the salts thereof, respectively, can be prepared in accordance with the present invention. The adduct compounds having $[HgI_4]^{--}$ complexes and $[BiI_4]$ complexes, however, can be used only under certain process conditions.

$H_2[HgI_4]$ or $H[BiI_4]$ and the salts thereof form 1:1—adducts with crown ethers such as DB-21-C-7 (but generally they are employed with an excess of crown ether up to 100%). (It is noted that an $H_2[HgI_4]$ adduct solution which is in contact with an aqueous Cs containing solution to be extracted really contains the $[HgI_3]^-$ ion.) Adduct solutions containing such adducts can be produced, in a manner similar to the production of adduct solutions containing the hexachloroantimonates (V), by (1) extraction of the complex acid from a 6 to 10 mol/l hydrochloric acid solution into a polar organic solvent containing a crown ether, or (2) direct dissolution of the individual adduct components in a polar organic solvent, or (3) by dissolution in a polar organic solvent of an adduct obtained by precipitation. All the above-mentioned solvents used to produce the hexachloroantimonates, namely, nitrobenzene, 1,2-dichlorobenzene, 1,1,2,2-tetrachloroethane, 1,2-dichloroethane, and mixtures thereof are suitable for the production of adduct solutions with tetraiodo mercurates. Only nitrobenzene, however, shows sufficient dissolving power for adducts with tetraiodo bismuthates.

$H_2[HgI_4]$ and the salts thereof are not, or are only minimally soluble, in the above solvents in the absence of DB-21-C-7 or of another crown ether. It is true that solutions of H[BiI$_4$] in nitrobenzene have already been described as extraction agents for Cs$^+$. See, M. Kyrs, et al, *Anal. Chim. Acta.* Volume 27, (1962) 183. Extraction solutions containing H[BiI$_4$] in combination with a crown ether, however, are not known in the art.

The tetraiodo bismuth acid, or the salts thereof, respectively, heavily bleed in the absence of the crown ether and are quickly destroyed in an oxidizing environment. If an excess of crown ether and the K$^+$ form are used, bleeding is prevented and destruction by oxidation is repressed.

Adducts of DB-21-C-7 with tetraiodo mercurate and tetraiodo bismutate, however, are not suitable for extraction from the MAW described in Table 1 above, because they result in the formation of I$_2$, HgI$_2$ or BiI$_3$, respectively.

The problems are caused by Fe(III) and probably by ruthenium as well. Therefore, in Examples 11 to 16 below which employ these adducts, there was utilized MAW solutions which are free of Ru and Fe.

Moreover, it is not possible to use these adducts in continuous operation in HNO$_3$ solutions, even in the absence of Fe and Ru.

In this manner, after a throughput of 1 liter of a 0.5 mol/l NaNO$_3$ and 1 mol/l HNO$_3$ solution through an extraction vessel containing 20 mol of a 0.018 mol/l DB-21-C-7/K[BiI$_4$] (2:1) (based on the mols of Bi) adduct solution in nitrobenzene, containing 0.036 mol/l DB-21-C-7 and 0.018 mol/l K[BiI$_4$], the Cs$^+$ capacity had been lowered to 77.1% of the initial Cs capacity after a total of 6 h. After a further resting contact of approximately 20 h, the Cs capacity was 42.5% of the initial capacity of 0.018 mol Cs/l (adduct solution). The freed iodine had colored the aqueous phase a brownish yellow.

For this reason, the use of tetraiodo bismuthate adducts and tetraiodo mercurate adducts in continuous processes is probably limited to non-oxidizing MAW solutions. As can be seen from Examples 11 to 16 below, however, simple batch operations can still be successfully executed with the use of HNO$_3$ acidic MAW solutions which are free of Fe and Ru.

A description of the adducts and their solutions, respectively, is given in the Examples 11 to 16 below.

The following examples are given by way of illustration to further explain the principles of the invention. These examples are merely illustrative and are not to be understood as limiting the scope and underlying principles of the invention in any way. All percentages referred to herein are by weight and all ratios for the components of the adduct compound are mol ratios unless otherwise indicated.

EXAMPLE 1

This example illustrates the use of a 0.018 mol/l DB-21-C-7/X$^+$[SbCl$_6$]$^-$ solution, where X$^+$ is H$^+$, Na$^+$, K$^+$, NH$_4^+$ or Tl$^+$ and the concentration is based on the mols of antimony.

An adduct solution in an amount of 0.5 dm$^3$ and containing 0.018 mol/l adduct was produced according to three different techniques a, b, and c as follows:

Technique a

In 100 cm$^3$ of 6 mol/l HCl, there were dissolved 1.7 g Sb$_2$O$_3$ (0.012 mol Sb (III)), to obtain an H[SbCl$_4$] solution in HCl. (SbCl$_3$ can be used instead of Sb$_2$O$_3$). Then, a total of 2.5 g NaNO$_2$ (0.036 mol) were added in small portions to oxidize the [SbCl$_4$]$^-$ to [SbCl$_6$]$^-$, with formation of NO$_x$. After the formation of NO$_x$ had been completed, the Na[SbCl$_6$] salt was extracted for 30 minutes with 0.5 dm$^3$ of a desired organic solvent in which 3.7 g DB-21-C-7 (0.0091 mol) had been dissolved to prepare a DB-21-C-7/Na[SbCl$_6$] (1:1) adduct. The adduct was then present mostly in the Na$^+$ form.

The adduct was then converted into various desired charged forms by contact with an appropriate aqueous solution. Before the conversion into the desired charged form, a certain excess of DB-21-C-7, as compared to the 1:1 adduct, was dissolved in the organic solvent phase for the purpose of adding more stability to the adduct solution. The excess was 50 to 100% for the H$^+$ and Na$^+$ forms, respectively, 50% for the NH$_4^+$ form, and 10 to 100% for the K$^+$ form.

Then the conversion into the individual charged forms took place as follows:

(1) H$^+$ form: by shaking the adduct solution with 10 mol/l HCl solution;
(2) Na$^+$ form: by shaking the adduct solution with 3 mol/l NaCl solution;
(3) K$^+$ form: by shaking the adduct solution with 3 mol/l KCl solution;
(4) NH$_4^+$ form: by shaking the adduct solution with 3 mol/l NH$_4$Cl solution;
(5) Tl$^+$ form: by shaking the adduct solution with a saturated TlNO$_4$ solution.

If the resulting adduct solutions are to be stored over a long period of time, they are subsequently dried over MgSO$_4$. If the adduct solutions are to be used immediately, however, dehydration can be omitted. The dehydrated solution can be stored for months. Occasionally occurring reddish brown discolorations of the adduct solutions disappear when brought into contact with HNO$_3$. If nitrobenzene is used as the organic solvent, care should be taken that no excess of Sb$_2$O$_3$ is used, since H[SbCl$_6$] is extracted in nitrobenzene even in the absence of DB-21-C-7.

Technique b

To be absolutely certain that only the [SbCl$_6$]$^-$ ion was produced, and not another species, e.g., [SbCl$_5$OH], the extraction of Technique a was carried out in 10 mol/l of HCl, and SbCl$_5$ was used instead of Sb$_2$O$_3$ or SbCl$_3$. Thus, oxidation with NaNO$_2$ was eliminated, and an adduct solution in the pure H$^+$ form was obtained. This variation in the adduct production is especially suitable for the production of the adducts in a purely solid form. See the corresponding techniques described above in Technique 1a, Technique 1b, and Technique 2 (Technique 2a and Technique 2b) under the heading Crown Ether-Hexachloroantimony Adducts. There are no differences in the extraction behavior of the adduct solutions produced according to Technique a or b.

In particular, in Technique b the adduct solution was produced by a method similar to Technique a, by extracting 100 cm$^3$ of a 10 mol/l HCl solution, which contained 2 cm$^3$ SbCl$_5$ with 0.5 dm$^3$ of the desired organic solvent, which contained 3.7 g DB-21-C-7. The adduct produced according to Technique b was subsequently converted into the desired M(I) charged form in the same manner as described in Technique a.

Technique c

In 0.5 l of the desired organic solvent, there was dissolved 3.7 g DB-21-C-7 plus a corresponding excess (as described in technique "a"), and a corresponding quantity of an M[SbCl$_6$] dioxane adduct. For example, 4.8 g NH$_4$[SbCl$_6$].2 dioxane or 5.0 g K[SbCl$_6$].2 dioxane can be dissolved in the organic solvent. In this manner, the desired form of the adduct is obtained directly.

The adducts are hydrolyzable since they contain Sb(V). For example, the Na$^+$ adduct (1:1) virtually hydrolyzes completely when it is in contact with H$_2$O or 1 mol/l HNO$_3$. The hydrolysis of the Na$^+$ adduct, however, can be repressed, as previously pointed out, by (a) by high Cl$^-$ concentration; (b) by a high Na$^+$ concentration of the solution to be extracted (in this respect, the high Na+ concentration in the above-mentioned MAW of Table 1 has a postive effect); and (c) by using the NH$_4$+ or the K+ form instead of the Na+.

Nevertheless, in an experiment conducted with 0.018 mol/l [1:1] (based on the mols of Sb) adduct solution in 1,2-dichloroethane, marked with Sb$^{125}$, and with a throughput of 1 dm$^3$ of the MAW of Table 1, 55% of the Na+ form and 40% of the NH$_4$+ form bled out. According to an especially advantageous embodiment of the present invention, however, the hydrolysis could be repressed almost completely, by stabilizing the solution by adding an approximately 50% DB-21-C-7 excess to the 1:1 adduct solution after the production of the 1:1 adduct solution. This excess was achieved by adding 1.9 g DB-21-C-7 per 0.5 dm$^3$ of 1:1 adduct solution. The same experiment was then repeated using the stabilized adduct solution, and the bleeding rate of the Na+ forms was then only 1.8% and 0.6%, respectively.

There were produced according to Technique b, 0.018 mol/l DB-21C-7/X[SbCl$_6$] adduct solutions in 1,1,2,2,tetra-chloroethane, where X=H, Na, K, NH$_4$, or Tl by employing a DB-21-C-7 excess of 50%, as compared to a 1:1 adduct, i.e., 0.018 mol/l X[SbCl$_6$] and 0.027 mol/l DB-21-C-7. Portions of 20 ml each of these adduct solutions were shaken for 1 h together with 20 ml of the MAW described in Table 1. The extraction coefficients listed in the following Table 4 were obtained in a single distribution extraction process.

TABLE 4

| DB—21-C—7/X[SbCl$_6$] | D | Extraction percentage (%) |
|---|---|---|
| DB—21-C—7/H[SbCl$_6$] | 24 | 96.0 |
| DB—21-C—7/Na[SbCl$_6$] | 23 | 95.8 |
| DB—21-C—7/NH$_4$[SbCl$_6$] | 14 | 93.3 |
| DB—21-C—7/K[SbCl$_6$] | 12 | 92.3 |
| DB—21-C—7/Tl[SbCl$_6$] | 1.5 | 60.0 |

EXAMPLE 2

This example illustrates the use of a 0.018 mol/l (based on the mols of Sb) DB-21-C-7/K[SbCl$_6$] solution in a discontinuous extraction process.

In the discontinuous extraction process, 20 cm$^3$ of a 0.018 mol/l DB-21-C-7/K[SbCl$_6$] (1:1) solution in nitrobenzene, which had been produced according to one of the techniques of Example 1, were brought into contact in a stationary adduct phase with the above-mentioned MAW of Table 1. After four to five distributions, (after separating the aqueous phase of the foregoing step from the stationary adduct phase in each distribution there was an addition of equal volumes of fresh MAW) D reached a constant value of 18 for Cs+.

A subsequent re-extraction with a 2 mol/l KNO$_3$ solution resulted in a re-extraction coefficient $\overline{D}$ value of 33 in the first distribution stage. The re-extraction was effected by employing a 1:1 volume ratio of the adduct solution to KNO$_3$ re-extraction solution. At the beginning of a new extraction cycle, the D value was at approximately 11, ultimately approaching again a limit value of about 18.

EXAMPLE 3

This example illustrates the use of a 0.018 mol/l DB-21-C-7/K[SbCl$_6$] (2:1) solution (based on the mols of Sb) in a continuous extraction process.

In a mixer-settler unit, as shown in FIG. 1, 1 liter of a "MAW pH 0" solution, 1 liter of a "MAW pH 13" solution, and 1 liter of the "MAW pH 0" solution, each saturated in nitrobenzene, were put successively through 40 cm$^3$ of a 0.018 mol/l DB-21-C-7/K[SbCl$_6$] solution (based on the mols of Sb) in nitrobenzene produced according to Technique c of Example 1, and having a DB-21-C-7 excess of 100%, as compared to a 1:1 adduct. The extractions in the mixer-settler lasted approximately 10 hours.

The capacity of the adduct solution was subsequently determined by the extraction of a neutral 0.1 mol/l CsNo$_3$ solution.

The "MAW pH 0" represents a simplified acid MAW of the composition 1 mol/l HNO$_3$, 0.5 mol/l NaNO$_3$, and 50 ppm K+.

In a corresponding experiment, it was demonstrated that of the components of the above-mentioned MAW of Table 1, only H+, Na+ and K+ have any influence on the Cs+ extraction, thus making this simplification permissible.

The "MAW ph 13" solution has the same ion strength as the simulated strongly acid MAW described in Table 1, is drastically simplified, and has the following composition:

1.5 mol/l NaNO$_3$, 0.1 mol/l NaOH, 50 ppm K+.

A milky turbidity of the organic phase which could be observed in the beginning, disappeared after approximately 1 h and was attributed to the presence of dioxane which was slowly rinsed out of the organic phase.

A capacity of >0.018 mol Cs+/l adduct solution was determined. Allowing for the concentration of the adduct phase due, in spite of the saturation, to the loss of approximately 2 cm$^3$ nitrobenzene, there was no reduction in capacity. The high degree of stability of the DB-21-C-7/hexachloroantimonate adduct is remarkable, especially if it is realized that hydrolysis starts already below 3 mol/l HCl in the case of pure hexachloroantimony acid.

EXAMPLE 4

This example illustrates the use of a 0.018 mol/l DB-21-C-7/K[SbCl$_6$] (1.1:1) solution (based on the mols of Sb) in a continuous extraction process.

A procedure analogous to that of Example 3 was followed, except that instead of a DB-21-C-7 excess of 100%, only an excess of 10% was used. There was no capacity reduction in Example 4, and the same capacity as in Example 3 was obtained.

EXAMPLE 5

This example illustrates the use of a 0.018 DB-21-C-7/K[SbCl$_6$] (2:1) solution (based on the mols of Sb).

Several liters of the above-mentioned simulated MAW solution of Table 1 were decontaminated successfully in a continuously operating demonstration apparatus comprising 5 extraction vessels in the form of mixer-settler units.

One of these units is shown in FIG. 1. Each unit of the extraction apparatus contains one 100 cm$^3$ beaker 1, in which a glass cylinder 2 is concentrically located on small spaced apart legs 3. In this manner, a connecting gap is left open directly above the bottom 4 of beaker 1. A mobile MAW phase 6 can pass through connecting gap 5 into a settling chamber 7 which is the space between cylinder 2 and the wall of the beaker 1. The interior of glass cylinder 2 defines a mixer chamber 8. In mixer chamber 8, the continuously introduced MAW solution 6 is mixed with an added adduct solution 9 by stirring with the aid of a stirrer 10. Adduct solution 9 can be continuously circulated, but the continuous throughput of adduct solution 9 is not shown in FIG. 1.

The mixer-settler unit shown in FIG. 1 is not part of the present invention, but was constructed in accordance with the disclosure of W. Fischer et al., *Angew. Chem.* Volume 78 (1966), page 19. Different devices, however, can be used as well for the process according to the present invention.

As stationary phase, 20 to 40 cm$^3$ of the corresponding adduct solution 9 was added into mixer chamber 8. A multiple hose pump, not shown in FIG. 1, having a pumping rate of 250 cm$^3$/h, was used to pump the mobile MAW phase 6. Thus, the contact times were sufficient for setting the equilibrium and the phase separation was very good in spite of the simple apparatus.

A quantity of 140 cm$^3$ of a 0.018 mol/l DB-21-C-7/K[SbCl$_6$] (2:1) solution (based on the mols of Sb), in nitrobenzene produced according to Technique (c) of Example 1, was distributed as follows among the five mixer-settler units of the described continuously operating model apparatus:
1st and 2nd extraction vessels: 40 cm$^3$ each
3rd to 5th extraction vessels: 20 cm$^3$ each.

In a corresponding experiment, it was demonstrated that, given the stated adduct concentration and volume distribution, 12.5 l of the MAW of Table 1 can be freed from the radioactive Cs to a total decontamination factor of approximately 100. After the continuous extraction had taken place, there were present in the first extraction vessel, 57.7%, in the second, 28.5%, in the third, 8.3%, in the fourth, 3.6%, and in the fifth, 1.9% of the total Cs$^{134}$ activity, which corresponded to a capacity utilization of 30.2%, 14.9%, 8.7%, 3.7% and 2.0%, respectively.

After the extraction, there was a subsequent continuous re-extraction or regeneration in the opposite direction. This re-extraction required only 50 cm$^3$ of a 2 mol/l KNO$_3$ solution with a reduced stirring speed and a throughput time of ½ h.

The KNO$_3$ re-extraction solution containing the radioactive Cs was subsequently concentrated by evaporation with the aid of an IR lamp, whereby a colorless salt cake of a volume of approximately 5 cm$^3$ was obtained. Thus, a total volume reduction factor of approximately 2500 is obtained. It should be possible to obtain considerably higher volume reduction values of $>10^4$ and throughputs from 20 to 30 liters of the mentioned MAW solution of Table 1, given a total volume of 100 cm$^3$ of the adduct solution per extraction cycle, if a 16-stage mixer-settler apparatus operating according to the countercurrent principle and designed according to W. Ochsenfeld et al, *Kerntechnik*, Volume 5, (1963), page 218 et seq, is used.

Finally, the adduct concentration can even be doubled or tripled, resulting in an extraction coefficient $>40$ for the present adduct.

EXAMPLE 6

This example illustrates the use of a DB-21-C-7/Na[SbCl$_6$] solution in a single distribution extraction process.

A quantity of 20 ml of a 0.036 mol/l DB-21-C-7/Na[SbCl$_6$] solution (based on the mols of Sb) in 1,2-dichlorobenzene having a 50% DB-21-C-7 excess (which corresponds to the 1.5:1 adduct), produced according to Technique b of Example 1, was shaken for one h with 20 mol of the MAW solution of Table 1. An extraction coefficient of 68 was obtained for the Cs$^+$.

EXAMPLE 7

This example illustrates the use of a DB-24-C-8/Na[SbCl$_6$] adduct solution in a single distribution extraction process.

A quantity of 20 ml of a 0.018 mol/l DB-24-C-8/Na[SbCl$_6$] solution (based on the mols of Sb) in 1,2-dichloroethane having a DB-24-C-8 excess of 50% (which corresponds to the 1.5:1 adduct), produced according to Technique b of Example 1, was shaken with 20 ml of a solution of 20 ppm Cs$^+$ in 1 mol/l HNO$_3$. An extraction coefficient of 9.2 was obtained for the Cs.

EXAMPLE 8

This example illustrates the use of a DB-21-C-7/NaTPB adduct solution in a single distribution extraction process.

The adduct solution was produced by dissolving 6.2 g sodium tetraphenylborate and 14.6 g DB-21-C-7 in 1 dm$^3$ nitrobenzene. The adduct solution contained 0.018 mol/l NaTPB and 0.036 mol/l DB-21-C-7 (which corresponds to the 2:1 adduct).

A quantity of 20 ml of the adduct solution was shaken for ½ h with 20 ml of the MAW solution of Table 1. An extraction coefficient of 23.0 was obtained for the Cs$^+$.

EXAMPLE 9

This example illustrates the use of a DB-21-C-7/NaTPB solution in a single distribution extraction process.

A quantity of 20 ml of a DB-21-C-7/NaTPB (2:1) adduct solution in nitrobenzene, produced by following the procedure of Example 8, was shaken for 1 hour with 20 ml of "MAW pH 13" which contained 4 ppm Cs$^+$, 1.5 mol/l NaNO$_3$, and 0.1 mol/l NaOH. An extraction coefficient D of 12.6 was obtained for Cs$^+$.

The adduct solution containing the Cs$^+$ ions was then regenerated by using 20 ml of a 2 mol/l KNO$_3$ solution to re-extract the Cs ions. This regeneration produced a re-extraction coefficient $\overline{D}$ of 30.9.

In comparison, an extraction was performed with a pure 0.018 mol/l NaTPB solution in nitrobenzene. Such an extraction produced an extraction coefficient D of 48.2. When this solution was regenerated, however, a re-extraction coefficient of $\overline{D}$ of 1.0 was obtained.

EXAMPLE 10

This example illustrates the use of a DB-21-C-7/NaTPB solution in a single distribution extraction process.

A quantity of 20 ml of a DB-21-C-7/NaTPB (2:1) adduct solution in 1,2-dichloroethane, produced according to Example 8 by substituting 1,2-dichloroethane for the nitrobenzene, was shaken for 1 h with 20 ml of the "MAW pH 13". The extraction coefficient obtained for Cs$^+$ was approximately 8.4.

In a comparative test, an extraction was performed using NaTPB in the absence of DB-21-C-7. In this comparative test, 62% of the $Cs^+$ was precipitated as a nonextractable CsTPB precipitate. In the comparative test, because of the minimal solubility of NaTPB in 1,2-dichloroethane, the NaTPB was added to the aqueous phase to be extracted, likewise at 0.018 mol/l.

EXAMPLE 11

This example illustrates the use of a DB-21-C-7/K[HgI$_3$] (2:1) adduct solution in a single distribution extraction procedure.

The DB-21-C-7/K[HgI$_3$] adduct was produced by an extraction process.

A quantity of 0.6 g HgCl$_2$ was dissolved in 50 ml H$_2$O by means of heating. While stirring, 1.8 g KI was added to the still hot solution, whereby the tetraiodo complex was formed. After cooling down, the solution was vigorously shaken for 5 minutes with 50 ml 1,2-dichloroethane in which 0.73 g DB-21-C-7 had been dissolved. The organic phase was separated from the aqueous phase, dried over MgSo$_4$, mixed with another 0.73 g DB-21-C-7 and introduced into a 100 ml graduated flask which was then filled up to the mark with 1,2-dichloroethane.

The adduct solution produced in this manner contained 0.018 mol/l K[HgI$_3$] and 0.036 mol/l DB-21-C-7.

A quantity of 20 ml of this adduct solution was shaken for 1 h with 20 ml of a solution of 20 ppm $Cs^+$ in 1 mol/l HNO$_3$ and kept in contact with the aqueous phase for another 20 h. An extraction coefficient of 20.3 was obtained for the $Cs^+$.

The above procedure was repeated, except that a 1:1 (v/v) mixture of 1,2-dichloroethane and 1,2-dichlorobenzene was used instead of 1,2-dichloroethane. Use of this 1:1 mixture produced the same extraction coefficient for this adduct.

EXAMPLE 12

This example illustrates the use of a DB-21-C-7/K[HgI$_3$] adduct solution in a single distribution extraction procedure.

The DB-21-C-7/K[HgI$_3$] adduct was produced by dissolving the individual adduct components in 1,2-dichloroethane.

Specifically, the adduct solution was produced by dissolving 11.2 g K[HgI$_3$] and 14.6 g DB-21-C-7 in 1 dm$^3$ 1,2-dichloroethane. The solution produced in this manner contained 0.018 mol/l K[HgI$_3$] and 0.036 mol/l DB-21-C-7.

A quantity of 20 ml of this adduct solution was shaken for 1 h with 20 ml of "MAW pH 13". The extraction coefficient obtained was approximately 4.3.

EXAMPLE 13

This example illustrates the use of a DB-21-C-7/K[HgI$_3$] (2:1) adduct solution.

The adduct solution was produced by dissolving a solid adduct which had been previously isolated in crystalline form.

Specifically, 0.8 g HgCl$_2$ was dissolved in 30 ml H$_2$O by heating. While stirring, 2.3 g KI were added to the still hot solution, whereby the tetraiodomercuric complex was formed, which was recognizable by the yellowing of the solution. The solution was left to cool, and transferred to a 100 ml shaking funnel where the tetraiodomercuric complex was extracted by means of a solution of 1.0 g DM-21-C-7 in 30 ml dichloromethane during a 5 minute shaking. The organic phase, which now contained a 1:1 DB-21-C-7/tetraiodomercuric adduct, was removed from the shaking funnel, and dried over MgSO$_4$. Subsequently, in a rotation evaporator, the organic phase was concentrated by evaporation to a few ml, and then mixed with 5 ml dioxane. The adduct crystallized when 20 ml ethanol was added. The adduct was filtered by suction by means of a Buchner funnel, washed with some ethanol and dried at 60° C. The adduct was obtained in a yield of 84% of theoretical.

The adduct solution for extraction of cesium ions was produced by dissolving 23.0 g of the (1:1) adduct thus produced and 78.3 g of the DB-21-C-7 in 1 dm$^3$ 1,2-dichloroethane. The adduct solution contained 0.018 mol/l K[HgI$_3$] and 0.036 mol/l DB-21-C-7 (which corresponds to the 2:1 adduct).

Of this adduct solution, 20 ml were shaken for 1 h with 20 ml of a solution of 100 ppm $Cs^+$ and containing 1 mol/l HNO$_3$ and 0.5 mol/l NaNO$_3$. The adduct solution was left in contact with this Cs containing solution for another 20 h. An extraction coefficient of 7.6 was already reached after the second distribution. An extraction coefficient D of 6.2 was obtained after the first distribution.

EXAMPLE 14

The procedure of Example 13 was followed, except that nitrobenzene was used instead of 1,2-dichloroethane. An extraction coefficient of 7.1 was obtained after the first distribution.

EXAMPLE 15

This example illustrates the use of a DB-24-C-8/Na[BiI$_4$] (2:1) adduct solution in single distribution extraction procedure.

The adduct solution was produced by dissolving an adduct which has been isolated from a homogeneous solution by means of precipitation.

Specifically, a quantity of 2.2 g of a basic bismuth (III) nitrate was dissolved, with the use of heat, in 80 ml acetic acid of 96% concentration. After having cooled down, 5 g NaI were added while stirring, to thereby form the orange red [BiI$_4$]$^-$ complex. Within 5 minutes, a solution of 3 g DB-24-C-8 in 80 ml acetic acid of 96% concentration was stirred drop by drop into the BiI$_4$ complex solution, whereby a voluminous orange precipitate was formed. The orange precipitate was a 1:1 adduct of DB-24-C-8 with Na[BiI$_4$]. After stirring continuously for ½ h at room temperature, the 1:1 adduct was separated by means of a Buchner funnel. This 1:1 adduct was washed with H$_2$O and chloroform and dried at 50° C.

A yield of 7.7 g orange powder was obtained which was equal to 97% of the theoretical yield.

The adduct solution for extraction of cesium ions was then produced by dissolving 14.3 g of the adduct produced in this manner and 5.4 g DB-24-C-8 in 1 dm$^3$ nitrobenzene. The adduct solution contained 0.012 mol/l Na[BiI$_4$] and 0.024 mol/l DB-24-C-8.

Of this adduct solution, 20 ml were shaken for 1 h with 20 ml of a solution of 20 ppm $Cs^+$ in 1 mol/l HNO$_3$. The adduct solution was left in contact with this $Cs^+$ solution for another 20 h. The resulting extraction coefficient was about 3.8.

EXAMPLE 16

This example illustrates the use of a DB-21-C-7/Na[BiI$_4$] (2:1) solution in a single distribution extraction process.

The adduct solution was produced by dissolving in 1 dm$^3$ nitrobenzene, 20.6 g of the DB-21-C-7/Na[BiI$_4$] solid adduct, produced according to Example 15, and 7.3 g DB-21-C-7. The adduct solution contained 0.018 mol/l Na[BiI$_4$] and 0.036 mol/l DB-21-C-7 (which corresponds to the 2:1 adduct).

Of the thus produced adduct solution, 20 ml were shaken for 1 h with a solution of 100 ppm Cs$^+$ and containing 1 mol/l HNO$_3$ and 0.5 mol/l NaNO$_3$.

The adduct solution was kept in contact with this solution for another 20 h. An extraction coefficient of 23.5 was obtained.

It will be understood that the above description of the present invention is susceptible to various modifications, changes and adaptations, and the same are intended to be comprehended within the meaning and range of equivalents of the appended claims.

We claim:
1. A process for extracting cesium ions from an aqueous solution, comprising:
    (a) producing, in a polar organic solvent, an adduct compound which is the product of (i) a macrocyclic polyether containing at least one species of the structural elements

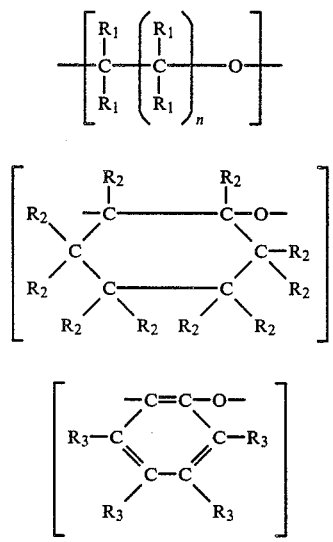

where, in structure I, n represents one of the numbers 0, 1 or 2, the —C—(C)$_n$—O group forms part of the polyether ring and R$_1$ is H, CH$_3$, or phenyl, with up to 4 R$_1$ not being H; in structure II, the —C—C—O— group froms part of the polyether ring and R$_2$ is H, CH$_3$, t-butyl, pentyl, heptyl, nonyl, (CH$_2$)$_9$CH$_3$, or phenyl; with up to 2 R$_2$ not being H; and in structure III, the —C—C—O group forms part of the polyether ring and R$_3$ is H, CH$_3$, t-butyl, pentyl, heptyl nonyl, (CH$_2$)$_9$CH$_3$, or phenyl, with up to 2 R$_3$ not being H; with (ii) an inorganic complex acid or a salt of the inorganic complex acid, the acid or salt containing a multivalent element of the third main group, the fifth main group, or the second subgroup of the Periodic Table as the central atom, and as ligands, a plurality of atoms of an element of the seventh main group, or a plurality of phenyl radicals or cyano radicals, excluding the establishment of an adduct of dibenzo 18-crown-6 with sodium tetraphenylborate (DB-18-C-6/NaTPB);

(b) bringing the aqueous solution containing cesium ions into contact with an adduct phase containing the adduct compound to extract the cesium from the aqueous phase into the adduct phase and thereby charge the adduct phase, and (c) separating the adduct phase charged with cesium ions from the aqueous solution.

2. Process as defined in claim 1, wherein the adduct compound is used dissolved in an organic solvent selected from the group nitrobenzene, 1,2-dichlorobenzene, 1,1,2,2-tetrachloroethane, 1,2-dichloroethane, chloroform or mixtures thereof.

3. Process as defined in claim 1, wherein the adduct compound is used as liquid ion exchanger phase on silica gel as carrier material.

4. Process as defined in claim 1, wherein the adduct compound is used as solid ion exchanger phase in solvent-free and solid form, on a carrier material.

5. Process as defined in claim 4 wherein silica gel is the carrier material.

6. Process as defined in claim 4 wherein aluminum oxide is the carrier material.

7. Process as defined in claim 4, wherein the adduct compound is an X$^+$[SbCl$_6$]$^-$/polyether adduct, where X$^+$ is H$^+$, Na$^+$, K$^+$, NH$_4^+$ or Tl$^+$, and is applied onto the carrier material from an adduct solution in acetone, dichloromethane, chloroform or 1,2-dichloroethane.

8. Process as defined in claim 1, wherein the adduct compound, after extraction of the polar organic solvent used to produce the adduct compound, is used directly in solid form as a stationary phase.

9. Process as defined in claim 1, wherein the macrocyclical polyether is selected from dibenzo-18-crown-6, dicyclo-hexyl-18-crown-6, or higher homologues thereof having up to 30 atoms in ring form and containing up to 10 O-atoms, and benzo-15-crown-5.

10. Process as defined in claim 1, wherein the inorganic complex acid or salt thereof is H$^+$[SbCl$_6$]$^-$ or the M$^+$[SbCl$_6$]$^-$ salt thereof, where M$^+$=Na$^+$, K$^+$, NH$_4^+$ or Tl$^+$.

11. Process as defined in claim 1, wherein the adduct compound is produced by employing M$^+$[SbCl$_6$]$^-$-dioxane, where M$^+$=[H$_3$O]$^+$, Na$^+$, K$^+$, NH$_4^+$ or Tl$^+$, as the complex organic acid salt.

12. Process as defined in claim 1, wherein the adduct compound is produced by dissolving the individual components of the adduct in nitrobenzene, 1,2-dichlorobenzene, 1,1,2,2-tetrachloroethane or 1,2-dichloroethane, or mixtures thereof, in a molar ratio of macrocyclic polyether to complex acid or complex salt, respectively, of $\geq$1:1.

13. Process as defined in claim 1, wherein the adduct compound is used as an adduct solution produced by dissolving a solid or oily adduct compound in a polar organic solvent, the solid or oily adduct compound having been obtained by the steps comprising: (1) extracting H$^+$[SbCl$_6$]$^-$ from 6 to 10 mol/l hydrochloric acid into a crown ether/dichloromethane solution to obtain a dichloromethane phase, (2) treating the dichloromethane phase with an aqueous phase comprised of a M$^+$ chloride solution, where M$^+$=Na$^+$, K$^+$ or NH$_4^+$ or comprised of an aqueous TlNO$_3$ solution, (3) separating the aqueous phase from the dichloromethane phase, and (4) drying and evaporating the dichloromethane phase which has been separated from the aqueous phase to obtain the solid or oily adduct compound.

14. Process ad defined in claim 13, wherein the crown ether is a dibenzo crown ether.

15. Process as defined in claim 1, wherein the adduct compound is used as an adduct solution produced by dissolving an adduct compound in crystalline state in a polar organic solvent, the adduct compound having been obtained by the steps comprising: (1) extracting $H^+[SbCl_6]^-$ from 6 to 10 mol/l hydrochloric acid into a crown ether/dichloromethane solution to form a dichloromethane phase, (2) treating the dichloromethane phase with an aqueous phase containing a $M^+$ chloride solution, where $M^+ = Na^+$, $K^+$ or $NH_4^+$, or containing an aqueous $TlNO_3$ solution, (3) separating the aqueous phase from the dichloromethane phase, (4) drying and evaporating the dichloromethane phase which has been separated from the aqueous phase to obtain the adduct compound in crystalline form, (5) dissolving the adduct compound obtained in step (4) in a solvent, and (6) precipitating the adduct compound from the solvent of step (5) by adding diethyl ether or dioxane.

16. Process as defined in claim 15, wherein the crown ether is a dibenzo crown ether.

17. Process as defined in claim 1, wherein the adduct compound is used as an adduct solution produced by dissolving an adduct compound in crystalline state in a polar organic solvent, the adduct compound having been obtained by adding a $H^+[SbCl_6]^-$ solution in hydrochloric acid to a clear solution containing (a) a crown ether and (b) an aqueous $M^+Cl^-$ solution, where $M^+$ is $Na^+$, $K^+$ or $NH_4^+$, to precipitate the adduct compound.

18. Process as defined in claim 17, where the crown ether is a dibenzo crown ether.

19. Process as defined in claim 1, wherein the inorganic complex acid or salt thereof is $H_2[HgI_4]$ or the $Na^+$, $K^+$ or $NH_4^+$ salt thereof.

20. Process as defined in claim 1, wherein the inorganic complex acid or salt thereof is $H[BiI_4]$ or the $Na^+$, $K^+$ or $NH_4^+$ salt thereof.

21. Process as defined in claim 1, wherein the inorganic complex acid salt is selected from sodium triphenyl borate, sodium triphenyl cyanoborate, potassium triphenyl borate, and potassium triphenyl cyanoborate.

22. Process as defined in claim 1, wherein the adduct compound is the product of (i) a crown ether with a polyether ring containing 21 atoms and 7 O-atoms with one or more $R_1$ and/or $R_2$ and/or $R_3$.

($R_1 = H$, $CH_3$, or phenyl;
$R_2 = H$, $CH_3$, t-butyl, pentyl, heptyl, nonyl, $(CH_2)_9CH_3$, or phenyl; $R_3 = H$, $CH_3$, t-butyl, pentyl, heptyl, nonyl, $(CH_2)_9CH_3$, or phenyl) with (ii) an inorganic complex acid or a salt of the inorganic complex acid.

23. Process as defined in claim 5, wherein the adduct compound is an $X^+[SbCl_6]^-$/polyether adduct, where $X^+$ is $H^+$, $Na^+$, $K^+$, $NH_4^+$ or $Tl^+$, and is applied onto the carrier material from an adduct solution in acetone, dichloromethane, chloroform or 1,2-dichloroethane.

24. Process as defined in claim 6, wherein the adduct compound is an $X^+[SbCl_6]^-$/polyether adduct, where $X^+$ is $H^+$, $Na^+$, $K^+$, $NH_4^+$ or $Tl^+$, and is applied onto the carrier material from an adduct solution in acetone, dichloromethane, chloroform or 1,2-dichloroethane.

* * * * *